Nov. 8, 1966 C. W. RAFFERTY 3,283,679
VIBRATORY EARTH COMPACTING APPARATUS AND METHOD
Filed March 5, 1964 2 Sheets-Sheet 1

FIG. 1.

INVENTOR.
CECIL W. RAFFERTY
BY HIS ATTORNEYS
HARRIS, KIECH, RUSSELL & KERN

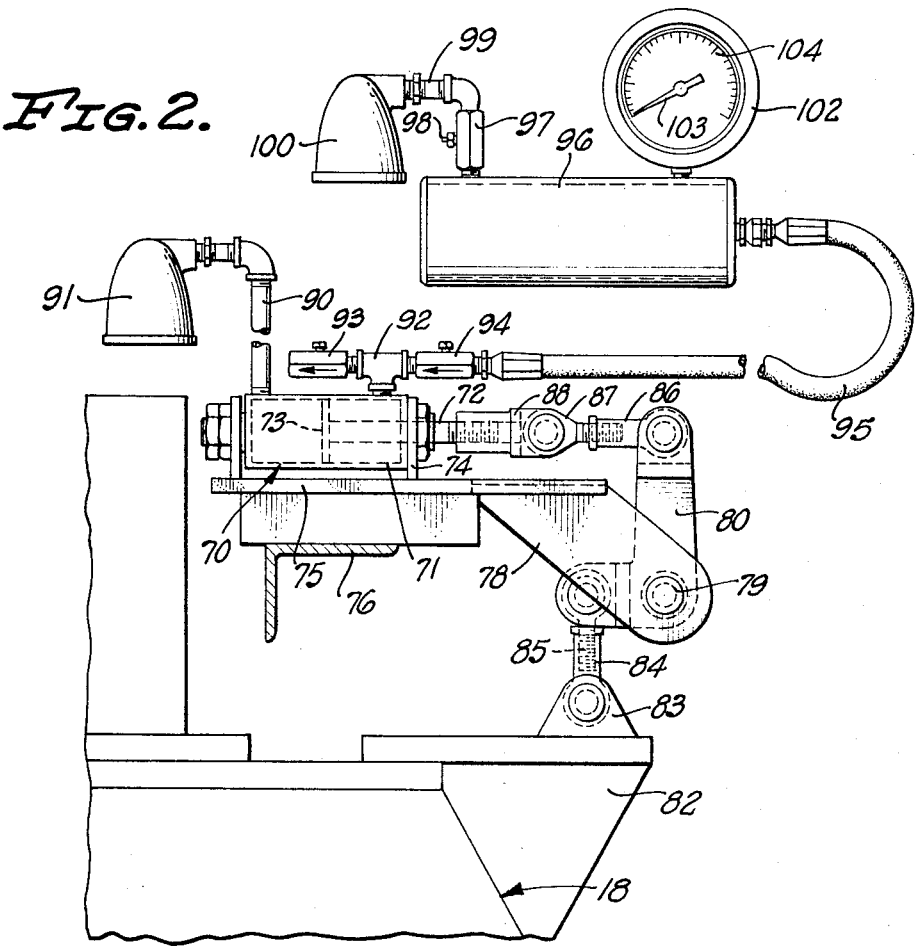

United States Patent Office 3,283,679
Patented Nov. 8, 1966

3,283,679
VIBRATORY EARTH COMPACTING APPARATUS AND METHOD
Cecil W. Rafferty, North Hollywood, Calif., assignor to Pettibone Mulliken Corporation, Chicago, Ill., a corporation of Delaware
Filed Mar. 5, 1964, Ser. No. 349,718
15 Claims. (Cl. 94—50)

My invention relates to vibratory soil compaction apparatus and more particularly to the control thereof to induce maximum compaction in the least number of passes, in the shortest length of time and to the greatest depth.

Known tractor-drawn vibrating-roll earth-compaction apparatus include a heavy main frame supported by an earth-engaging roll through suitable springs. The roll is journalled in a lighter roller frame to which the vibratory unit is connected to cause the roller frame and its roll to vibrate vertically relative to the heavy main frame, the latter being usually of sufficient weight to be essentially earth bound. The resulting vibration tends to compact the earth to a greater extent than would be accomplished solely by the total weight of the compaction apparatus.

If the vibration of the roll is induced by the turning of eccentric weights, driven by an engine serving this function, it will be found that the resulting movement of the roller frame will be out of phase with the turning of the eccentric weights. When the weights are in their lowest positions it would seem at first blush that the downward movement of the roll and the compacting effect would be at maximum values. I have found that the total compacting force lags the eccentric weights by a considerable angle, usually 90° or more, depending upon the rate of turning of the eccentric weights. This is due largely to the mass and inertia of the roller frame and the roll. This mass may still be moving downward at a time when the eccentric weights pass beyond their lowest positions. It is an object of the invention to control the vibration rate induced by the vibrator unit in such apparatus so as to maintain the phase angle at a value that will give best compaction when operating on different soils or different compactions of the same soil.

It is desirable that compaction to the required density be obtained in the least number of passes, in the shortest length of time and to the greatest possible depth. It has been found that maximum compaction to the greatest depth and in the shortest time is obtained at the resonant frequency of the vibrator-soil mass. Such resonant frequency is the number of cycles per second at which the soil mass vibrates in depth at the same frequency as that of the vibrating roll. The resonant frequency will vary with the size or mass of the vibrating roll and with the character of the soil being compacted.

There is no way of measuring the soil characteristics as the vibrating equipment is being advanced along the terrain. Nor is there presently available any way of determining the best speed or vibration rate when passing over an unknown soil to obtain maximum compaction in the shortest time. By way of example, compacting a loose soil in an as-spread condition may be best at a frequency of 10 cycles per second while with each succeeding pass the characteristics of the soil change, because the densities become greater and the spring system of the soil diminishes, requiring progressively higher frequencies if maximum compaction per pass is to be obtained.

Maximum compaction is obtained when the amplitude of vibration of the roller is kept at a maximum, the vibration being measured relative to the frame or to the earth. I have found that a measurement of this amplitude of vibration is an indication of soil condition and resonance. I have found also that maximum soil compaction effects are obtained if the speed of the eccentric weights is changed to maximize this amplitude of vibration. The amplitude of vibration may be in the neighborhood of ½″ when compacting loose soil but may be in the neighborhood of ⅜″ when passing over a partially compacted soil. The small differences are not readily detectable by simple observation.

It is an object of the invention to provide a simple means indicating and responsive to the amplitude of vibration of a vibratory roller in contact with the earth. A further object is to provide a method and apparatus by which maximum compactive effect is obtained by adjusting the speed of the engine driving the eccentrics to maintain the amplitude of roll vibration at a maximum.

Further objects and advantages of the invention will be apparent to those skilled in the art from the herein-described exemplary embodiment.

Referring to the drawings:

FIG. 1 is a side elevational view, partially in section, of a vibratory soil compaction apparatus incorporating the invention; and FIG. 2 illustrates the preferred control equipment of the invention in larger scale.

The invention will be exemplified in conjunction with known vibratory soil compaction apparatus 10 adapted to be drawn by a tractor 11 through any suitable connection 12 to compact the earth of a surface 13 when passing thereover.

The illustrated soil compaction apparatus 10 is supported on an earth-engaging roll 15 of any desired surface configuration. This roll may be solid or hollow and is journalled on a shaft 16 carried by a roller frame 18 which is movably mounted relative to a main frame 20 by use of pairs of links 22 and 23.

The roller frame 18 includes upright laterally spaced support plates 24 interconnected by angle irons 25 which are in turn bridged by a deck 26. Each link 22 is pivoted at one end to a bracket 28 of the roller frame and a bracket 29 of the main frame. Likewise each link 23 is pivoted to a bracket 30 of the roller frame 18 and to a similar bracket on the main frame, not shown.

The main frame 20 is supported from the roller frame 18 through springs 23 compressed between spring retainer plates 34 of the roller frame and brackets 35 of the main frame. The roller frame 18 and its roll 15 are thus resiliently connected to the main frame 20 in a manner to permit relative vertical movement under the action of the springs 33.

Means is provided for vibrating the roller frame and its roll through a vertical locus of motion to compact the soil therebeneath as the roll advances therealong. This means includes a vibrator 38 driven by a power unit, illustrated as a gasoline engine 40 the speed of which can be controlled from a position within reach of the driver of the tractor 11. As shown, a throttle connection 42 is suspended beneath an arm 43 and terminates in a throttle control assembly 44 providing a throttle control 45 within reach of the operator. The throttle interconnection can be direct or by use of any suitable electric, hydraulic or other remote control system.

A belt 48 connects an engine pulley 49 with a pulley 50 of the vibrator 38. The pulley 50 is in turn connected in known manner to drive meshed gears 52, 52' respectively attached to shafts 53 and 53' journalled in the frame of the vibrator 38. These shafts carry eccentric weights 55, 55' which turn in opposite directions as indicated by the opposed arrows. These weights are driven at a speed depending upon the throttle setting of the engine 40. When the weights are moving toward their lower positions shown in FIG. 1 they exert a strong downward force on the roller frame 18. When later moving toward their upper positions they exert an upward force on the roller frame. The actual movement of the roller frame and its roll 15 will lag such weights as previously explained.

The main frame 20 should be a much larger mass than the roller frame 18 to form what may be termed an earth-bound mass. In this respect the weight of the main frame 20 can be increased by ballast placed in chambers 60 thereof. The objective is to have the roller frame 18 vibrate vertically relative to an essentially earth-bound mass provided by the main frame.

As previously pointed out, maximum compaction in the least number of passes and in the shortest length of time is obtained when the roll 15 is moving up and down at the resonant frequency of the soil mass. The invention includes means for controlling the vibration rate to maintain this resonant condition when the equipment is passing over soils of different or unknown characteristic.

In this respect the invention employs means responsive to the amplitude of vertical movement of the roll 15 in conjunction with means for changing the speed of the engine to maximize such amplitude. The amplitude-responsive means can be of any suitable type but is shown as being of a pneumatic type. It should be capable of changing a measurable value in response to changes in amplitude, the measurable value being transmitted to a gage within view of the operator. The measurable value may be electric, pneumatic, hydraulic or any other physical value. For simplicity the invention preferably employs pneumatic values and induces changes in pressure which can be dependably measured.

As exemplified, the invention employs a means for creating fluid pressure variations in step with and varying with the amplitude of the vertical movement of the roll 15 relative to the main frame 20 as induced by the vibrator 38. This means is shown as including a fluid pump 70 developing fluid pressure variations varying in step and in amplitude with the vertical vibrations of the roll 15 relative to the main frame 20. As clearly shown in the drawings, the pump 70 includes a cylinder 71 closed at both ends by heads one of which receives a piston rod 72 connected to a piston 73. The pump is mounted between brackets 74 rigidly attached to a deck 75 which in turn is rigidly connected to an angle member 76 of the main frame 20. A bifurcated bracket 78 depends rearwardly from the deck 75 and carries a shaft 79 journalling a bell crank 80 which translates the upright vibratory motion of the roller frame 18 into a horizontal or lateral vibratory motion, preferably with amplification, used to drive the pump 70. FIG. 2 shows a simple interconnection described as follows.

A bracket 82 is connected to the rear end of the roller frame 18 and carries a trunnion block 83 pivoting a socketed eye-bolt 84 internally threaded to adjustably receive the pin of an eye-bolt 85 which in turn in pivoted to the shorter arm of the bell crank 80. This adjustable connection imparts a rocking motion to the bell crank when the roll 15 vibrates. The longer upright arm of the bell crank 80 is pivotally connected to another socketed eye-bolt 86 internally threaded to receive the pin of an eye-bolt 87 pivoted to a connecting member 88 threaded at its forward end to receive the piston rod 72. The piston 73 is thus reciprocated in step with the vibrations of the roll 15 but with an amplified locus of the motion depending upon the relative length of the arms of the bell crank 80. The initial position of the piston 73 in the cylinder 71 can be determined by adjustment of the links provided by the eye-bolts 84, 85 or 86, 87.

The variable-volume space within the cylinder 71 to the left of the piston 73 is vented to the atmosphere through a pipe 90 and an air filter 91. The variable-volume chamber on the opposite side of the piston 73 is a pump chamber and is employed to induce pressure variations which are integrated or averaged to produce a pressure changing with the amplitude of movement of the roll 15.

In the preferred embodiment this function is accomplished by connecting the lateral of a pipe T 92 to the variable-volume pump chamber of the cylinder 71. A discharge check valve 93 permits egress of air from the pump chamber as the piston 73 moves rightward. During leftward movement of the piston 73 air is drawn into the pump cylinder through an inlet check valve 94 and through a hose 95 connected to a receiver shown as a vacuum tank 96. Ingress of air into the vacuum tank 96 is restricted by a suitable restriction such as a needle valve 97 having an adjustment 98, the needle valve receiving air through a pipe 99 carrying an air filter 100. A pressure-responsive gage, shown as a vacuum gage 102, is connected to the vacuum tank 96 and is employed to adjust the speed of the engine 40 to maintain a maximum reading of the gage needle 103 relative to a graduated dial 104 of the gage. This gage 102 is preferably within view of the operator. As shown, the hose 95 can be extended to the tractor 11 to dispose both the gage and the tank 96 on the tractor.

Alternatively the tank 96 and its controlled intake can be disposed on the soil compacting apparatus 10, using a hose similar to 95 to connect the tank to the gage 102 on the tractor.

From the above it will be apparent that the illustrated pump 70 acts as a vacuum pump to create a subatmospheric pressure in the tank 96. This tank acts as a receiver and should be of sufficiently large volue at the existing setting of the needle valve 97 to largely damp out the pressure pulses induced by the piston transmitted to the tank 96 through the hose 95. The degree of vacuum in the tank 96 will be determined by the setting of the adjustment 98 of the needle valve 97. A change in this setting merely changes the position of the needle 103 relative to the dial 104.

The actual position of the needle 103 during operation of the device is not critical. What is important is that the throttle control 45 should be adjusted to maximize the reading of the gage 102, the throttle being opened slightly or closed slightly from time to time to maintain a maximum reading on the gage 102. In a given pass of the equipment in a path along which the soil condition is uniform the throttle can be controlled to maximize the gage reading at the start of the pass and no subsequent adjustment is needed to effect maximum compaction. During a later pass along the same path or if the equipment encounters nonuniform or other oil conditions a readjustment of the throttle will be required to maximize the reading of the gage 102. In all instances the gage reading will vary with the existing amplitude of vibration of the roll 15. If the reading is maximized the operator will know that the equipment is operating in resonance with the existing soil condition and that maximum compaction is being effected.

Instead of employing the pump 70 as a vacuum pump to maintain subatmospheric pressure in the container 96 it is possible to employ it as a positive-pressure pump by reversing the valves 93 and 94 and placing the tank 96 on the discharge side of the pump. A superatmospheric pressure will then be developed in the tank 96 and the valve 97 will control the discharge therefrom. The gage 102 will then be a positive-pressure gage reading pressures above atmosphere. I have found however that the vacuum-type system disclosed gives more accurate and more dependable operation.

Various changes and modifications can be made without departing from the spirit of the invention as defined in the appended claims.

I claim:

1. Vibratory soil compaction apparatus for maximum vibratory compaction of soils of different or unknown density while advancing therealong, said apparatus including in combination:

a main frame;

a roller frame resiliently mounted for vertical movement relative to said main frame;

an earth-engaging roll journalled in said roller frame supporting it and said main frame;
means for vibrating said roller frame and its roll through a vertical locus of motion to compact the soil beneath said roll as it advances along the soil in a path, said vibrating means including an engine mounted on said main frame;
means responsive to the amplitude of vertical movement of said roll during its advancement along said path, said amplitude responsive means including means responsive to incremental small changes in amplitude from a maximum amplitude; and
means for changing the speed of said engine to maximize said amplitude.

2. Vibratory soil compaction apparatus for maximum vibratory compaction of soils of different or unknown density while advancing therealong, said apparatus including in combination:
a main frame;
a roller frame resiliently mounted for vertical movement relative to said main frame;
an earth-engaging roll journalled in said roller frame supporting it and said main frame;
means for vibrating said roller frame and its roll through a vertical locus of motion to compact the soil beneath said roll as it advances along the soil in a path, said vibrating means including an engine mounted on said main frame, said engine including a throttle control at a control position within reach of the operator;
means responsive to the amplitude of vertical movement of said roll relative to said main frame during advancement of said roll along said path, said amplitude responsive means including means for changing a measurable value in response to changes in such amplitude; and
a gage within view of the operator at said control position responsive to incremental changes in said measurable value.

3. Apparatus as defined in claim 2 in which said measurable value is a pressure and in which said gage is a gage responsive to changes in pressure.

4. A vibratory soil compaction apparatus as defined in claim 2 including amplifying means connected between said roll and said amplitude responsive means for amplifying the degree of vertical movement of the roll transmitted to said amplitude responsive means.

5. Vibratory soil compaction apparatus for maximum vibratory compaction of soils of different or unknown density while advancing therealong, said apparatus including in combination:
a main frame;
a roller frame resiliently mounted for vertical movement relative to said main frame;
an earth-engaging roll journalled in said roller frame supporting it and said main frame;
means for vibrating said roller frame and its roll through a vertical locus of motion to compact the soil beneath said roll as it advances along the soil in a path, said vibrating means including an engine mounted on said main frame;
means for creating fluid pressure variations in step with and varying with the amplitude of the vertical movement of said roll relative to said main frame as induced by said vibrating means;
means for integrating and averaging said fluid pressure variations to produce a resultant fluid pressure varying with the amplitude of said vertical movement; and
means for measuring said resulting fluid pressure as an indication of the existing amplitude of said vertical movement of said roll as it advances along the soil in said path.

6. Vibratory soil compaction apparatus for maximum vibratory compaction of soils while advancing therealong, said apparatus including in combination:
a main frame;
a roller frame resiliently mounted for vertical movement relative to said main frame;
an earth-engaging roll journalled in said roller frame supporting it and said main frame;
means for vibrating said roller frame and its roll through a vertical locus of motion to compact the soil beneath said roll as it advances along the soil in a path, said vibrating means including an engine mounted on said main frame;
a fluid pump;
means for operatively connecting said pump to said vibrating roll to develop a fluid pressure varying with the amplitude of vertical vibration of said roll relative to said main frame; and
means responsive to said fluid pressure and thus responsive to the existing amplitude of movement of said roll as it advances along the soil in said path.

7. A vibratory soil compaction apparatus as defined in claim 6 in which said pump includes a variable-volume chamber changing in volume in step with the roll vibrations, and valve means controlling the fluid entering and leaving said chamber said variable-volume means producing pressure pulsations, said means responsive to said fluid pressure including means connected to said variable-volume chamber for damping out said pressure pulsations and producing a resulting pressure changing in magnitude with changes in the amplitude of vibration of said roll, said means responsive to said fluid pressure including also a gage responsive to said resulting pressure.

8. Vibratory soil compaction apparatus for maximum vibratory compaction of soils while advancing therealong, said apparatus including in combination:
a main frame;
a roller frame resiliently mounted for vertical movement relative to said main frame;
an earth-engaging roll journalled in said roller frame supporting it and said main frame;
means for vibrating said roller frame and its roll through a vertical locus of motion to compact the soil beneath said roll as it advances along the soil in a path, said vibrating means including an engine mounted on said main frame;
a vacuum pump;
a restriction on the inlet side of said vacuum pump restricting the flow of air thereinto;
means for driving said vacuum pump at a rate varying with the rate and amplitude of said roll vibrations; and
means responsive to the vacuum created by said vacuum pump between it and said restriction and thus responsive to the existing amplitude of movement of said roll as it advances along the soil in said path.

9. A vibratory soil compaction apparatus as defined in claim 8 in which said restriction is an adjustable needle valve.

10. Vibratory soil compaction apparatus for maximum vibratory compaction of soils while advancing therealong, said apparatus including in combination:
a main frame;
a roller frame resiliently mounted for vertical movement relative to said main frame;
an earth-engaging roll journalled in said roller frame supporting it and said main frame;
means for vibrating said roller frame and its roll through a vertical locus of motion to compact the soil beneath said roll as it advances along the soil in a path, said vibrating means including an engine mounted on said main frame;
a reciprocating vacuum pump having a cylinder and a piston;
a restriction on the inlet side of said vacuum pump restricting the flow of air thereto;

means operatively connecting said piston to said roll to vibrate in step therewith to create pressure pulsations below atmospheric pressure in step with the roll vibrations; and a vacuum responsive means responsive to the means of said subatmospheric pressure pulsations and thus responsible to the existing amplitude of movement of said roll as it advances along the soil in said path.

11. A vibratory soil compaction apparatus as defined in claim 10 in which said vacuum responsive means is a vacuum gage, and including a receiver chamber between said restriction and the inlet of said vacuum pump of sufficiently large volume to largely damp out the pulsations created by said vacuum pump, said vacuum gage being connected to said receiver.

12. Vibratory soil compaction apparatus for maximum vibratory compaction of soils while advancing therealong, said apparatus including in combination:

a main frame;

a roller frame resiliently mounted for vertical movement relative to said main frame;

an earth-engaging roll journalled in said roller frame supporting it and said main frame;

means for vibrating said roller frame and its roll through a vertical locus of motion to compact the soil beneath said roll as it advances along the soil in a path, said vibrating means including an engine mounted on said main frame;

a vacuum pump including a cylinder mounted on said main frame, a piston reciprocable in said cylinder cooperating therewith and providing a variable-volume chamber on one side of said piston, an inlet check valve through which air may enter said variable-volume chamber and a discharge check valve through which air exhausts from said chamber, said discharge check valve opening to the atmosphere;

means operatively connecting said piston to said roller frame to vibrate in step therewith;

a receiver chamber connected to said inlet check valve;

an adjustable needle valve controlling entry of air into said receiving chamber; and a vacuum gage connected to said receiving chamber.

13. A vibratory soil compaction apparatus as defined in claim 12 including another variable-volume chamber within said cylinder on the opposite side of said piston, an air filter through which said other variable-volume chamber is vented to the atmosphere, and an air filter supplying air to said adjustable needle valve.

14. A method of inducing maximum vibratory compaction of soils by use of a roll movable on the earth in a path, which method includes the steps of:

vertically vibrating said roll during movement along such path;

measuring the amplitude of vertical vibration of said roll; and controlling the rate of vibration of such roll to maintain the measured amplitude at substantially a maximum value.

15. A method of inducing maximum vibratory compaction of soils by use of a roll movable on the earth in a path, which method includes the steps of:

vertically vibrating said roll during movement along such path;

inducing fluid pressure variations in step with the vibrations of said roll and of a magnitude substantially proportional thereto;

smoothing out said pressure variations to develop a mean pressure; and controlling the rate of vibration of said roll to maintain said mean pressure at substantially a maximum value.

References Cited by the Examiner

UNITED STATES PATENTS

| 2,466,822 | 4/1949 | Pollitz | 94—50 |
| 3,000,278 | 9/1961 | Kaltenegger | 94—50 |
| 3,145,631 | 8/1964 | Green | 94—50 |

FOREIGN PATENTS 236,869  1/1962  Australia.

JACOB L. NACKENOFF, *Primary Examiner.*

CHARLES E. O'CONNELL, *Examiner.*

N. C. BYERS, *Assistant Examiner.*